(12) United States Patent
Åberg

(10) Patent No.: US 10,363,626 B2
(45) Date of Patent: Jul. 30, 2019

(54) CONTROL METHOD FOR MIG/MAG-WELDING AND WELDING EQUIPMENT APPLYING THIS METHOD

(75) Inventor: Per Åberg, Laxå (SE)

(73) Assignee: ESAB AB (SE)

( * ) Notice: Subject to any disclaimer, the term of this patent is extended or adjusted under 35 U.S.C. 154(b) by 1812 days.

(21) Appl. No.: 12/066,281

(22) PCT Filed: Sep. 11, 2006

(86) PCT No.: PCT/SE2006/050322
§ 371 (c)(1),
(2), (4) Date: Jul. 24, 2008

(87) PCT Pub. No.: WO2007/032734
PCT Pub. Date: Mar. 22, 2007

(65) Prior Publication Data
US 2009/0302014 A1   Dec. 10, 2009

(30) Foreign Application Priority Data
Sep. 12, 2005 (SE) ...................... 0502013

(51) Int. Cl.
B23K 9/09 (2006.01)
B23K 9/095 (2006.01)
B23K 9/173 (2006.01)

(52) U.S. Cl.
CPC ............ B23K 9/091 (2013.01); B23K 9/0953 (2013.01); B23K 9/173 (2013.01)

(58) Field of Classification Search
CPC .......... B23K 9/00; B23K 9/067; B23K 9/092; B23K 9/091; B23K 9/0953; B23K 9/173;
(Continued)

(56) References Cited

U.S. PATENT DOCUMENTS 2,027,224 A   1/1936 David
3,731,049 A * 5/1973 Kiyohara et al. ........ 219/137.71
(Continued)

FOREIGN PATENT DOCUMENTS

EP   1182001   2/2002
GB   2053762 A   2/1981
(Continued)

OTHER PUBLICATIONS

Japanese Office Action for JP 2008-529963, dated Mar. 13, 2012—with English translation.

*Primary Examiner* — Tu B Hoang
*Assistant Examiner* — Diallo I Duniver
(74) *Attorney, Agent, or Firm* — Edell, Shapiro & Finnan, LLC

(57) ABSTRACT

The present invention refers to a control method and welding equipment for MIG/MAG-welding with presence of short-circuiting droplets between an electrode end and a workpiece. The method comprises establishment of a short-circuiting time, establishment of an arc time, and controlling the energy supplied to the electrode. The energy supply is controlled in such a way that the energy supply is increased if a measured short-circuiting time of a total period time, where the period time is the sum of the short-circuiting time and the arc time, exceeds a defined adjustable set value and decreases if said short-circuiting percentage goes below said set value.

19 Claims, 2 Drawing Sheets

(58) Field of Classification Search
CPC ........ B23K 9/125; B23K 9/10; B23K 9/0671; B23K 9/0734
USPC ... 219/130.51, 130.2, 130.1, 130.31, 130.32, 219/130.33, 130.4, 130.5, 137 R, 137 PS
See application file for complete search history.

(56) References Cited

U.S. PATENT DOCUMENTS

| | | | | |
|---|---|---|---|---|
| 3,809,853 | A | * | 5/1974 | Manz .................... B23K 9/092 219/130.21 |
| 4,036,795 | A | | 7/1977 | Tominaga |
| 4,254,322 | A | * | 3/1981 | Asano ................. B23K 9/0213 219/122 |
| 4,518,844 | A | | 5/1985 | Needham |
| 4,546,234 | A | * | 10/1985 | Ogasawara ............ B23K 9/091 219/130.21 |
| 4,647,754 | A | * | 3/1987 | Hirasawa ............... B23K 9/091 219/130.01 |
| RE33,330 | E | * | 9/1990 | Ogasawara et al. .... 219/137 PS |
| 5,406,052 | A | * | 4/1995 | Mizuno ................. B23K 9/092 219/130.51 |
| 5,824,991 | A | * | 10/1998 | Mita et al. ................ 219/130.51 |
| 5,834,732 | A | * | 11/1998 | Innami ................... B23K 9/091 219/130.31 |
| 6,031,203 | A | * | 2/2000 | Suzuki .................. B23K 9/073 219/130.01 |
| 6,512,200 | B2 | | 1/2003 | Norrish et al. |
| 2007/0175876 | A1 | * | 8/2007 | Aberg ................... B23K 9/173 219/130.51 |

FOREIGN PATENT DOCUMENTS

| | | |
|---|---|---|
| JP | 51-36230 | 10/1976 |
| JP | 05-285661 | 11/1993 |
| JP | 08-155645 | 6/1996 |
| JP | 08155645 A * | 6/1996 |
| JP | 8155645 A | 6/1996 |
| JP | 2003-326361 A | 11/2003 |

* cited by examiner

CONTROL METHOD FOR MIG/MAG-WELDING AND WELDING EQUIPMENT APPLYING THIS METHOD

FIELD OF THE INVENTION

The present invention refers generally to the control of a short arc welding process in a welding equipment adapted for MIG/MAG-welding.

BACKGROUND

In gas metal arc welding with melting, continuously fed electrode, frequently named MIG/MAG-welding, the workpiece is heated primarily by the arc. The electrode is heated, partly by the power supplied when the weld current flows through the electrode stick out i.e. the free electrode end between the contact tip, where the current transfer to the electrode takes place, and the arc, partly by the arc itself. The basic control of the welding process aims at achieving an electrode melting speed which corresponds to the electrode feed speed. Further objects of the control may for instance be to influence the amount of heat transferred to the workpiece.

MIG/MAG-welding takes place in one of three states. In short arc welding, the material transport from the electrode to the workpiece takes place through large short-circuiting droplets. Since the process consists in alternating arc and short-circuiting droplet transitions, the average voltage between the electrode and the workpiece becomes low and thus the heat transfer to the base material will remain moderate. When the supplied power is increased, one passes into the mixed arc area, where the material transport takes place through a mixture of short-circuiting and non-short-circuiting droplets. The result is an unstable arc with significant weld spatter and weld smoke. Welding in this area is normally avoided. At a sufficiently high supplied power, the process enters the spray area, where material transport takes place through small finely dispersed droplets without short circuits. The spatter quantity is clearly lower than in short arc welding. The heat supply to the base material will be greater making this method suitable primarily for thicker workpieces.

The third state is referred to as pulsed welding and means that, by means of advanced control, one controls the proper cut off of the droplets by means of a suitable current pulse. Each pulse cuts off a droplet and the droplets become sufficiently small so as not to short-circuit. This method results in advantages from the spray area in the form of low weld spatter without the disadvantages of large heat transfer. In the following, equipment adapted for MIG/MAG-welding according to the short arc method is considered. The state here alternates between short-circuiting and arc between the weld wire end (electrode end) and the workpiece. The dynamic properties of the weld current source together with the adjustments determine the time of the short-circuiting. During normal welding each short circuit ought to be 0.5-40 milliseconds. Dynamic properties may be created by dimensioning the inner resistance in the weld transformer, inductor and electronic circuits, and the inductance of the inductor. In modern machines, the inductor is frequently of an electronic kind, i.e. a process regulator comprising hardware and software. This is so in order to be able to vary the dynamic properties at the start process in relation to welding during continuance. The dynamic properties of a welding machine determine how fast the welding current can be controlled and adjusted during the welding process. The process regulator thus gives the properties, which influence each individual short-circuiting process by defining, in the process regulator, the current increasing rate during short-circuiting.

The static characteristic of the machine is mainly defined by the inner resistance or its equivalent in a process regulator. Static characteristics of a power supply in a welding machine must be adapted to the welding method that the machine will perform. A MIG/MAG-machine adapted for short arc welding is to be considered as a constant voltage source having a slightly decreasing characteristic, normally 3V per 100 A. This can be compared to a TIG welding machine where instead the current is constant.

In more simple welding machines there is a setting knob for the electrode feed speed and a setting knob for the choice of one of several voltage outlets from the weld transformer in the welding machine. This may be replaced by a wheel for controlling the ignition angle on a thyristor for generating the weld voltage. In modern inverter machines, the weld voltage may be controlled with a great precision. Modern inverter technology with switch mode power supply and micro processor controlled transistors offer faster and more precise control of the static characteristics and the dynamic characteristics compared to other power supply configurations with thyristors or step controlled transformers that need to be adapted for each welding method and welding case.

A well-known problem is that a suitable reference value for the voltage for each electrode speed is dependent on such factors as electrode material, electrode dimension and shielding gas type. A usual manner in welding machines of today is to include in the control computer of the welding machine experience in form of suitable welding parameters for various electrode feed speeds for varying combinations of values of the influencing factors mentioned above, so called synergy lines. Producing such lines for all combinations of influencing factors represents an extensive work in the form of test weldings and documentation. In addition, the material quality may vary between different deliveries and lead to the fact that previously tested synergy lines do not function any longer. Furthermore, shielding gases are now marketed with supplier specific names without specifying the composition of the gas. Also, this leads to problems in having a predetermined quantity of synergy lines suitable for all weld cases. Not even a later repetition of an apparently identical weld case does have to succeed since the composition of the gases or the weld electrode may have been changed by the manufacturer without notice. Obviously, this leads to a troublesome uncertainty when welding a new batch.

Another problem is that the technique up to now does not give a uniform weld result at varying distance between the contact tip in the weld torch and the workpiece, such as during passage of areas of tack welding and corners.

SUMMARY OF THE INVENTION

Consequently, the object of the present invention is to provide a method and a device for short arc welding, which completely or partly remedies the mentioned problem of the known technique.

This object is achieved by the method steps defined in the independent method claim, and by the features of the independent apparatus claim.

Advantageous embodiments are defined in the dependent claims.

The introduction of a regulator for maintaining the percentage of the short-circuiting time of the period time constant at the desired set value, where the period time is the sum of the short-circuiting time and the arc time has had a particular and surprisingly good effect on the tolerance of the welding towards different external influencing factors, such as distance keeping between a contact tip and the workpiece. Furthermore, a machine of this kind is operable for a large variety of weld electrode dimensions and materials. Likewise, a proper tolerance towards different shielding gas compositions is achieved. The need of tested synergy lines is to a large extent not needed any longer, and thus the security of a proper repetition accuracy during welding with materials from different suppliers and from different manufacturing batches is increased.

The method has a surprisingly good effect in that it is usable, at least partly, into the spray area. In the colder part of the spray area, a small percentage of short-circuiting droplet transitions is still present. With an adjustment of 2-5% short-circuiting percentage, a stable control also of this part of the spray area, sometimes mentioned under the concept RapidArc, is obtained. During pure short arc welding, a suitable short-circuiting percentage is, however, 17-25%, and 21% has shown to be the most suitable as a start value. If a colder weld is desired, the percentage is increased and vice versa. An inputting device having this function to adjust the set value for the short-circuiting percentage should be present on the current source, electrode feeder or adjustment box.

In order to achieve the effect of and the stability in the control, it is required that the control parameters are adjusted to obtain continuance after a disturbance within 50-1000 milliseconds, which means that this regulator does not control the individual short-circuiting percentage but the average value of a plurality thereof.

According to a further embodiment of the invention, the establishment of the short-circuiting time comprises establishment of a short-circuiting, which is based on a measured voltage and a short-circuiting is considered to be present when the voltage goes below an established limit value for the short-circuiting. In a corresponding manner, the establishment of the arc time may comprise establishment of an arc, which is based on a measured voltage and an arc is considered to be present when measured voltage exceeds an established value for the arc.

According to a further embodiment of the invention, the establishment of the short-circuiting time comprises establishment of a short-circuiting, which is based on light measurement and a short-circuiting is considered to be present when the light intensity goes below an established limit value for short-circuiting, and arc is considered to be present when the measured light intensity exceeds an established value for the arc. In a corresponding manner, the establishment of the arc time may comprise establishment of an arc, which is based on light measurement and an arc is considered to be present when the measured light intensity exceeds an established value for the arc.

According to a further embodiment of the invention, the establishment of the short-circuiting time comprises establishment of a short-circuiting, which is based on sound measurement and a short circuit is considered to be present when the measured sound frequency has a predetermined value. In a corresponding manner, the establishment of the arc time may comprise establishment of an arc, which is based on sound measurement and an arc is considered to be present when the measured sound frequency has a predetermined value. For instance, an arc may be considered to be present when the measured sound frequency lies within an established interval, and a short-circuiting may be considered to be present otherwise or vice versa.

BRIEF DESCRIPTION OF THE DRAWINGS

The invention is now to be described more closely by means of embodiments and with reference to the drawings attached, in which.

DESCRIPTION OF EMBODIMENTS

In the following some possible embodiments of the invention will be described. Further embodiments may of course be possible within the scope of the claims.

Figure 1:
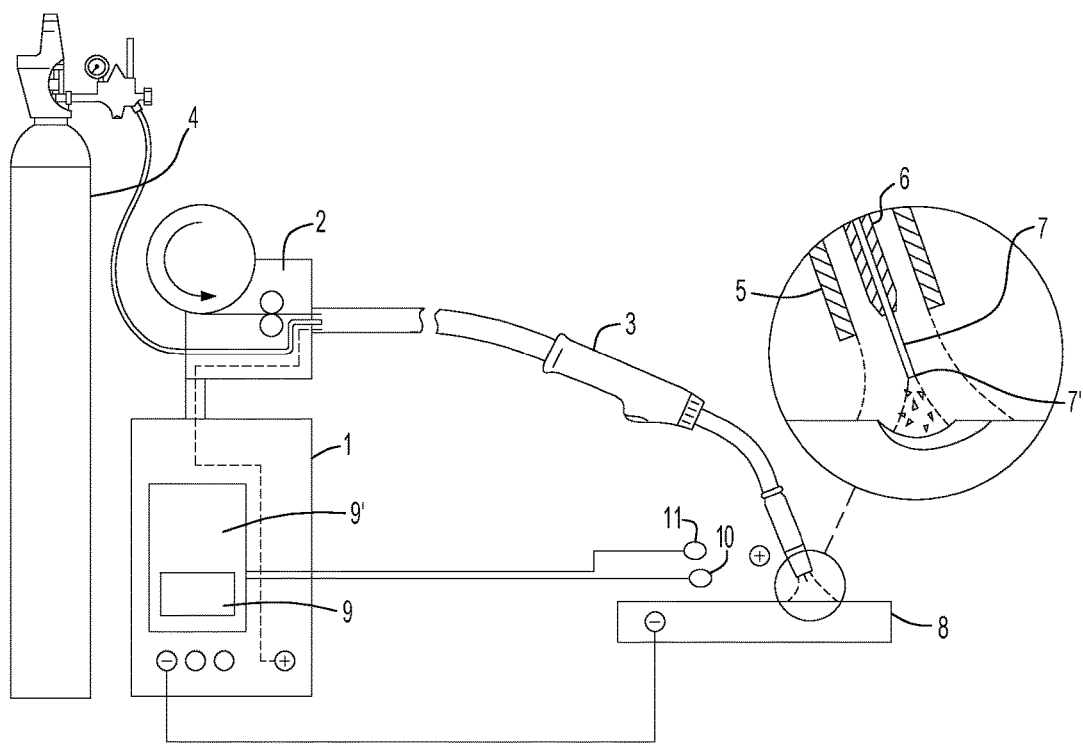
FIG. 1 discloses schematically a device for MIG/MAG-welding.
Figure 2:
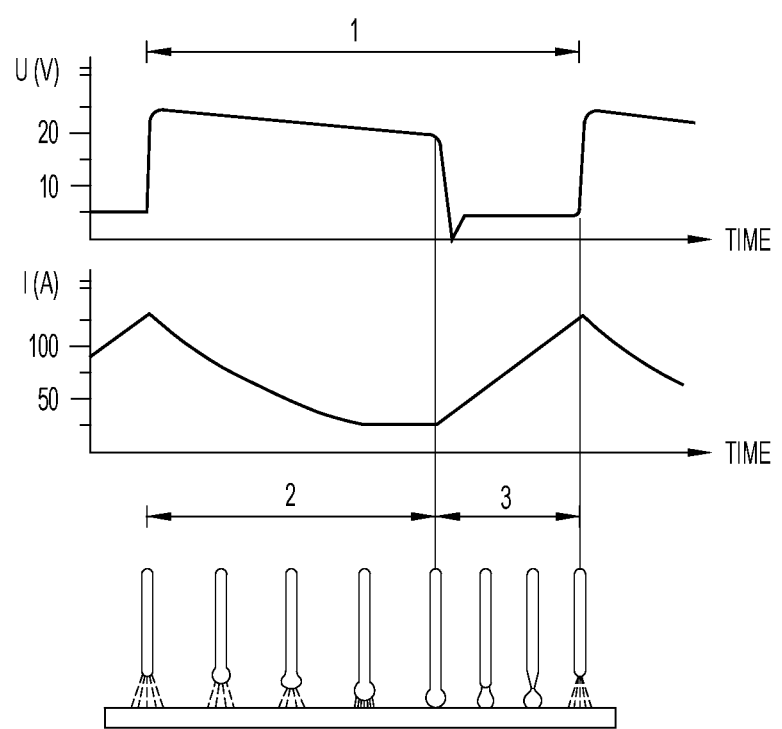
FIG. 2 discloses how the current and the voltage are changed when a droplet is transferred between the weld electrode and the workpiece during short arc welding.

FIG. 1 discloses welding equipment for MIG/MAG welding with the presence of short-circuiting droplets between an end 7' of an electrode 7 and a workpiece 8. The welding equipment disclosed comprises a welding machine 1 having a current source adapted to supply welding energy, or melting power, to the electrode 7. Preferably the current source comprises an inverter power supply. An electrode feeder 2 is provided on the welding machine 1. The electrode feeder 2 is adapted to feed the electrode 7 to a welding torch 3. The welding torch 3 is connected to the electrode feeder 2, the welding machine 1 and a gas container 4 via a welding cable. The welding torch 3 comprises a gas cup 5 and a contact tube 6 through which the electrode 7 is fed to a position in the proximity of the workpiece 8. Welding gas is supplied from the gas container 4 to the space enclosed between the gas cup 5 and the contact tube 6.

Furthermore, the welding equipment comprises control equipment comprising a regulator 9 and a process regulator 9'. In the embodiment disclosed the regulator 9 is included in the process regulator 9'. The regulator 9 may form an integrated part of the process regulator 9'. However, the process regulator 9 and the regulator 9' may form two separate control units of the control equipment, preferably arranged in series so that the output signal of the regulator 9 forms an input signal to the process regulator 9'. The control equipment also comprises a schematically indicated first sensor 10, which is adapted to sense a short circuit between the electrode 7 and the workpiece 8, and a schematically indicated second sensor 11, which is adapted to sense an arc between the electrode 7 and the workpiece 8. The regulator 9 and the first sensor 10 together form means for establishing a short-circuiting time, i.e. the duration of a short circuit. The regulator 9 and the second sensor 11 together form means for establishing an arc time, i.e. the duration of an arc.

The first means 9, 10 is adapted to establish a short-circuiting time, i.e. the duration of a short-circuit between the electrode end 7' and the work piece 8. The second means 9, 11 is adapted to establish an arc time, i.e. the duration of an arc between the electrode end 7' and the work piece 8. The regulator 9, co-acting with and the process regulator 9', is adapted to control the energy supplied to the electrode 7 in such a way that the energy supply is increased if a measured short-circuiting time of a total period time, where the period time is the sum of the short-circuiting time and the arc time, exceeds a defined adjustable set value and decreases if said short-circuiting percentage goes below said set value. Consequently, the regulator 9 and the process regulator 9' will maintain the short-circuiting percentage at a constant, desired set value.

The invention is primarily used for maintaining the short-circuiting percentage constant at a desired set value. This is achieved by letting the regulator 9 for this purpose leave its output signal further to the inner process regulator 9' with the purpose of controlling the welding process in a micro perspective, i.e. to give the current source its static and dynamic characteristic.

The invention may, however, as an alternative also be performed in more simple machines such as thyristor-controlled weld current sources without any particular process regulator. In this case the regulator of the invention controls directly the ignition angle for the thyristor of the welding machine 1.

The invention may also be used in for instance a step controlled machine where the wire feed member motor instead is controlled so that the energy supply or the melting power is influenced as described in claim 1.

The control equipment may be implemented in software as well as hardware of analogue or digital type.

The following formula describes the control algorithm in one embodiment:

$$E_{n+1}=E_n-k(R_{reg}-R_n)$$ where the following applies

E=The output signal from the short-circuiting time regulator=input signal to the original weld process regulator k=amplifying constant in the integrating short-circuiting time regulator. k is selected so that the time from a disturbance to a continuance state becomes 50-1000 ms, preferably 250-350 milliseconds.

Also a proportional part can be present in the control algorithm.

R=short-circuiting time/(short-circuiting time+arc time)
$R_{reg}$=set value for R
$R_n$=latest measured value of R 1. Updating of $E_n$ takes place after each new measured $R_n$
2. If the period time >150 ms, $R_n$ is set to a low value such as 1%
3. An arc extinction results in that there is no updating of $E_n$
4. If an arc extinction is longer than 150 ms 2 above is valid.

It is advantageous to use the latest control value at a following weld start. For this memory storing of control values are thus required also after disconnection of the welding equipment. If the electrode feed speed is changed since the last welding, a value is interpolated for a secure weld start. This means thus that also the electrode feed speed value should be memory stored also in case of current drop out.

What is claimed is:

1. A control method for MIG/MAG-welding with presence of short-circuiting droplets between an electrode end and a workpiece, the method comprising:
    measuring a short-circuiting time duration by a process regulator and a first sensor for sensing a short circuit,
    measuring an arc time duration by the process regulator and a second sensor for sensing an arc, and
    controlling energy supplied to the electrode by the process regulator by:
        calculating a period time duration by summing the arc time duration and the short-circuiting time duration,
        calculating a short-circuiting percentage as a ratio of the measured short circuiting time duration over the period time duration obtained by the calculation,
        determining whether the period time duration exceeds a threshold value,
        in response to determining that the period time duration exceeds the threshold value, decreasing the energy supplied regardless of the short-circuiting percentage,
        in response to determining that the period time duration does not exceed the threshold value:
            increasing the energy supplied in response to the short-circuiting percentage exceeding a defined adjustable set value, and
            decreasing the energy supplied in response to the short-circuiting percentage being less than the defined adjustable set value.

2. The control method according to claim 1, wherein the control is performed in order to achieve the defined adjustable set value for the short-circuit time duration as a part of the period time duration.

3. The control method according to claim 1, wherein the controlling the energy supplied to the electrode comprises determining the energy supplied based at least in part on an amplifying constant, wherein the amplifying constant is selected to obtain a continuance state after a disturbance within 50-1000 milliseconds.

4. The control method according to claim 1, wherein the step of measuring the short-circuiting time duration comprises establishing a short-circuiting, which is based on a measured voltage and the short-circuiting is considered to be present when the voltage goes below an established limit value for the short-circuiting.

5. The control method according to claim 1, wherein the step of measuring the arc time duration comprises establishing an arc, which is based on a measured voltage and the arc is considered to be present when measured voltage exceeds an established value for the arc.

6. The control method according to claim 1, wherein the step of measuring the short-circuiting time duration comprises establishing a short-circuiting, which is based on light measurement and a short-circuiting is considered to be present when the light intensity goes below an established limit value for short-circuiting, and arc is considered to be present when the measured light intensity exceeds an established value for the arc.

7. The control method according to claim 1, wherein the step of measuring the arc time duration comprises establishing an arc, which is based on light measurement and an arc is considered to be present when the measured light intensity exceeds an established value for the arc.

8. The control method according to claim 1, wherein the step of measuring the short-circuiting time duration comprises establishing a short-circuiting, which is based on sound measurement and a short circuit is considered to be present when the measured sound frequency has a predetermined value.

9. The control method according to claim 1, wherein the step of measuring the arc time duration comprises establishing an arc, which is based on sound measurement and an arc is considered to be present when the measured sound frequency has a predetermined value.

10. Welding equipment for MIG/MAG welding, comprising:
    a weld torch holding an electrode having an electrode end adapted to be fed to a position in the proximity of a workpiece;
    a welding machine adapted to supply energy to the electrode;

a first sensor for sensing a short circuit between the electrode and the workpiece;

a second sensor for sensing an arc between the electrode and the workpiece;

a regulator coupled to the first sensor and the second sensor, the regulator including software and hardware components operable for causing the regulator to:

measure a short-circuiting time duration based on an input received from the first sensor, the input from the first sensor indicating an occurrence of the short circuit;

measure an arc time duration based on an input received from the second sensor, the input from the second sensor indicating an occurrence of the arc; and sum the arc time duration and the short-circuiting time duration to form a period time duration; and a process regulator adapted to control energy supplied to the electrode by:

determining whether the period time duration exceeds a threshold value;

in response to determining that the period time duration exceeds the threshold value, decreasing the energy supplied regardless of a short-circuiting percentage;

in response to determining that the period time duration does not exceed the threshold value:

increasing the energy supplied in response to the measured short-circuiting time duration, as a percentage of the period time duration, exceeding a defined adjustable set value, and decreasing the energy supplied in response to the short-circuiting percentage being less than the set value.

11. The welding equipment according to claim 10, wherein the process regulator controls dynamic characteristics of the welding equipment.

12. The welding equipment according to claim 11, where the process regulator receives an input signal from the regulator for maintaining the short-circuiting percentage constant.

13. The welding equipment according to claim 10, wherein the regulator for maintaining the short-circuiting percentage constant controls an ignition angle for thyristors in a power module in the welding machine.

14. The welding equipment according to claim 10, wherein the regulator for maintaining the short-circuiting percentage constant controls an electrode feeder so that more electrode is fed when the short-circuiting percentage goes below the defined set value and vice versa.

15. The welding equipment according to claim 10, further comprising a memory for storing the latest used control parameters and applying the latest used control parameters at the next weld start.

16. A control method for MIG/MAG-welding with presence of short-circuiting droplets between an electrode end and a workpiece, the method comprising:

measuring a short-circuiting time duration;
measuring an arc time duration;

calculating a period time duration by summing the arc time duration and the short-circuiting time duration;

determining a short-circuit percentage as a ratio of the measured short circuit-time duration over the period time duration;

determining a difference between the short-circuit percentage and a set value; and generating an output signal to control energy supplied to the electrode based at least in part on the determined difference between the short-circuit percentage and the set value, by:

determining whether the period time duration exceeds a threshold value;

in response to determining that the period time duration exceeds the threshold value, decreasing the energy supplied regardless of the short-circuiting percentage;

in response to determining that the period time duration does not exceed the threshold value:

increasing the energy supplied in response to the determined short-circuit percentage exceeding the set value; and decreasing the energy supplied in response to the determined short-circuiting percentage being less than the set value.

17. The control method according to claim 16, wherein the short-circuit time duration is a first measured short-circuit time, the arc time duration is a first measured arc time, the short-circuit percentage is a first short-circuit percentage, and the output signal is a first output signal, the method further comprising:

measuring a second short-circuiting time;
measuring a second arc time;
determining a second short-circuit percentage as a ratio of the measured second short circuit-time over the sum of the measured second short-circuit time and the measured second arc time;

determining a difference between the second short-circuit percentage and a set value; and generating a second output signal to control energy supplied to the electrode, wherein the second output signal is generated based at least in part on the first output signal and the determined difference between the second short-circuit percentage and the set value.

18. The control method according to claim 17, wherein generating the second output signal comprises deriving the second output signal as the first output signal minus the difference between the second short-circuit percentage and the set value.

19. The control method according to claim 18, wherein generating the second output signal comprises deriving the second output signal as the first output signal minus the difference between the second short-circuit percentage and the set value multiplied by an amplifying constant, wherein the amplifying constant is selected so that a time from a disturbance to a continuance state is within 50-1000 milliseconds.

* * * * *